Patented Nov. 10, 1936

2,060,267

UNITED STATES PATENT OFFICE 2,060,267

HYDROGENATION OF ETHYLPROPYL-ACROLEIN

Walter J. Toussaint, South Charleston, W. Va., assignor, by mesne assignments, to Union Carbide and Carbon Corporation, a corporation of New York No Drawing. Application March 25, 1933, Serial No. 662,829

3 Claims. (Cl. 260—138)

The invention relates to a process of hydrogenating alpha-ethyl-beta-propylacrolein having especial reference to the production of hydrogenation products of this substance, such as alpha-ethylhexaldehyde, 2-ethyl-1-hexanol, and normal heptane.

The principal object of the invention is to provide a process for making hydrogenation products of alpha-ethyl-beta-propylacrolein, which is economical and efficient in operation, and is adapted to make commercially feasible the manufacture of such products.

Essentially the process comprises hydrogenating alpha-ethyl-beta-propylacrolein by the aid of a catalyst under appropriate conditions of temperature and pressure, and with certain proportions of the reacting materials, all as will be hereinafter more fully disclosed.

In conducting the process hydrogen gas is contacted with the aldehyde in either the liquid or vapor phase in the presence of a catalyst, and the reaction products are separated by fractionation. A finely divided metallic nickel catalyst is employed. This may be made by impregnating an inert carrier, such as artificial filter stone, with a soluble salt of the metal, and then reducing with hydrogen to form deposited metallic nickel. It can also be formed from a nickel-silicon alloy by heating it with an aqueous solution of caustic soda. Preferably a small amount of chromium, in about 1% to 5% based on the weight of the nickel is also present. Other methods known to the art may be used in forming the catalyst, but reference herein to a nickel catalyst should be understood to include not only this metal alone, but also combinations of nickel with the small quantities of chromium as mentioned.

From experiments which I have made the following examples are given, which will more clearly illustrate the invention:

*Example 1.*—A nickel catalyst made from nickel-silicon alloy, and containing about 4.3 grams of nickel was placed in a steel bomb of about 150 cc. capacity. To this was added 48 grams of redistilled alpha-ethyl-beta-propylacrolein. Hydrogen was then fed into the bomb to a pressure of about 900 pounds per square inch gauge, and the bomb was put in a steam bath at about 100° C. and shaken for one and a half hours. Whenever the pressure fell to 800 pounds per square inch, it was restored to 900 by introducing hydrogen. The mixture was allowed to stand 16 hours under hydrogen pressure from a commercial hydrogen cylinder, after which it was shaken but no absorption occurred. The reaction mixture was then cooled, filtered, and fractionated. The following cuts were obtained:

|   | Grams |
|---|---|
| 1. About 160° C | 28 |
| 2. About 170° C | 10 |
| 3. About 180° C | 0 |
| 4. Above 190° C | 2 |

Fraction 1 was essentially alpha-ethylhexaldehyde and Fraction 2 chiefly recovered unsaturated aldehyde. The 2-ethyl-1-hexanol would appear in Fraction 4, but in this particular test was present in too small quantities to isolate.

*Example 2.*—This test was conducted in substantially the same manner as Example 1, using 7.4 grams of nickel and 46 grams of alpha-ethyl-beta-propylacrolein. The bomb was heated in an oil bath to a temperature of 150° C. and shaken for eight hours with hydrogen at pressures of 500 to 900 pounds per square inch gauge. The mixture was filtered and fractionated. The following fractions were obtained:

|   | Grams |
|---|---|
| 1. Below 110° C | 5 |
| About 160° C | 12 |
| About 170° C | 6 |
| About 180° C | 16 |
| Above 190° C | 5 |

The materials boiling below 110° C. were chiefly heptane and water.

*Example 3.*—In this example the catalyst was impregnated on an inert carrier material, and included in addition to nickel small amounts of chromium, the proportion of the metals being about 10.5% nickel and 0.22% chromium. Fifty grams of alpha-ethyl-beta-propylacrolein and hydrogen in the molar ratio of 1:4.5 was passed over the catalyst at approximately atmospheric pressure, the catalyst being contained in a 1.25 inch tube electrically heated to about 158° C. The passage of materials was effected in 2.5 hours. Forty grams of product were obtained which were fractionated as follows:

|   | Grams |
|---|---|
| 1. Below 110° C | 5 |
| 2. About 160° C | 5 |
| 3. About 170° C | 11 |
| 4. About 180° C | 13 |
| 5. Above 190° C | 9 |

*Example 4.*—Operating data on this test are given in the following table. The hydrogenation was carried out in a unit equipped with a compressor for recycling the hydrogen. The feed was preheated before entering the catalyst chamber, and consisted of hydrogen and alpha-ethyl-beta-propylacrolein in the molar ratio of about 100 mols of hydrogen to one mol. of the aldehyde. Twenty pounds of catalyst were used which occupied a volume of about 9 liters. The catalyst was formed by impregnation on an inert carrier, and contained about 10.2% nickel and 0.36% chromium. An electrically heated converter was used. The effluent gases, after water cooling to remove condensable products, were recycled except for a small amount, which was vented through traps, cooled with a mixture of solid carbon dioxide and acetone.

*Operating conditions*

| | |
|---|---:|
| Time of run—hours | 7 |
| Pressure on converter—pounds per square inch—gauge | 20 |
| Feed rate, cc/hr | 600 |
| Temperature °C., average | 194 |
| Ethylpropylacrolein fed, g | 3598 |
| Products | |
|    Heptane, g | 200 |
|    Ethylhexaldehyde, g | 600 |
|    Ethylhexanol, g | 2696 |
|    Higher boiling, g | 280 |
| Material balance, % | 96.7 |
| Efficiency, % | 89 |
| Production ratio, g./l./hr | 42.7 |

The production ratio appearing in the table refers to grams of ethylhexanol produced per liter of catalyst used per hour.

It will be evident from these examples that the process is susceptible to considerable variation in actual operating conditions. Depending upon the manner of handling the reacting materials, the pressure most suitable may be as high as 900 pounds per square inch gauge, or it may be only sufficient to cause proper flow of the vapors through the converter. It is preferred to conduct the entire reaction with the alpha-ethyl-beta-propylacrolein in the vapor phase, and under these conditions a pressure of about 20 to 30 pounds per square inch gauge is suitable. The reaction will proceed at temperatures from about 100° C. to 230° C., but within this range a temperature approaching 200° C. is probably most appropriate. The ratio of the reacting materials should be such that a considerable excess of hydrogen is always present. When no means are provided for recycling the hydrogen, the molar ratio of the aldehyde to hydrogen may be about 1:4.5, whereas if provision is made for recycling the unreacted hydrogen, this molar ratio is preferably about 1:100.

On the other hand the reactions will proceed, but not to completion, in the presence of a deficiency of hydrogen. In this case the hydrocarbon fraction will contain a large proportion of heptylene as well as heptane, but may be converted practically entirely to heptane by repassage through the hot catalyst in the presence of an excess of hydrogen.

I claim:—

1. The process which comprises heating alpha-ethyl-beta-propylacrolein with hydrogen in the presence of a nickel catalyst, at a temperature of about 100° C. to 230° C. and at a gauge pressure of about 0 to 900 pounds per square inch, and separating from the reaction product alpha-ethylhexaldehyde, 2-ethyl-1-hexanol and normal heptane.

2. The process which comprises passing the vapor of alpha-ethyl-beta-propylacrolein and hydrogen over a nickel catalyst, at a temperature of about 150° C. to about 230° C. and at a gauge pressure not over 30 pounds per square inch, and separating from the reaction product alpha-ethylhexaldehyde, 2-ethyl-1-hexanol and normal heptane.

3. The process which comprises passing the vapors of alpha-ethyl-beta-propylacrolein and hydrogen in the molar ratio of about 1 to about 100, respectively, over a nickel catalyst, at a temperature of about 190° C. to about 200° C. and at a gauge pressure of about 20 pounds per square inch, and separating from the reaction product alpha-ethylhexaldehyde, 2-ethyl-1-hexanol and normal heptane.

WALTER J. TOUSSAINT.